(12) United States Patent
Yang et al.

(10) Patent No.: US 9,779,511 B2
(45) Date of Patent: Oct. 3, 2017

(54) METHOD AND APPARATUS FOR OBJECT TRACKING AND 3D DISPLAY BASED THEREON

(71) Applicant: SuperD Co. Ltd., Shenzhen (CN)

(72) Inventors: Qing Yang, Shenzhen (CN); Peiyun Jian, Shenzhen (CN); Dongfang Li, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 365 days.

(21) Appl. No.: 14/722,109

(22) Filed: May 26, 2015

(65) Prior Publication Data
US 2016/0105667 A1    Apr. 14, 2016

(30) Foreign Application Priority Data

Oct. 11, 2014   (CN) .......................... 2014 1 0535884

(51) Int. Cl.
| | |
|---|---|
| *G06T 7/20* | (2017.01) |
| *H04N 13/04* | (2006.01) |
| *G06T 7/277* | (2017.01) |

(52) U.S. Cl.
CPC ............ *G06T 7/2086* (2013.01); *G06T 7/277* (2017.01); *H04N 13/0468* (2013.01);
(Continued)

(58) Field of Classification Search
CPC ................. G06T 7/2086; G06T 7/277; G06T 2207/30201; G06T 2207/10016;
(Continued)

(56) References Cited

U.S. PATENT DOCUMENTS

| | | | |
|---|---|---|---|
| 6,169,966 B1* | 1/2001 | Miura | ................... G01S 3/7864 |
| | | | 702/142 |
| 7,616,187 B2* | 11/2009 | Koo | ................... H04N 13/0468 |
| | | | 345/156 |

(Continued)

FOREIGN PATENT DOCUMENTS

| | | |
|---|---|---|
| TW | I383178 B | 1/2013 |
| WO | 2010098024 A1 | 9/2010 |

OTHER PUBLICATIONS

Guo Long et al., "A new algorithm for maneuvering target tracking", Electronics Optics & Control, Sep. 30, 2008 vol. 15 No. 9 pp. 21-24.

(Continued)

*Primary Examiner* — Sath V Perungavoor
*Assistant Examiner* — Howard D Brown, Jr.
(74) *Attorney, Agent, or Firm* — Anova Law Group, PLLC

(57) ABSTRACT

An object tracking method is provided. The method includes obtaining current position coordinates of a tracked object for a first time using a tracking algorithm and initializing a filter acting on a time-varying system based on the obtained current position coordinates. The method further includes updating a system state through the filter acting on the time-varying system when the tracking algorithm outputs new current position coordinates of the tracked object with a spatial delay and comparing speed of the tracked object to a compensation determination threshold. Further, the method includes when the speed of the tracked object is greater than the compensation determination threshold, compensating the new current position coordinates of the tracked object with the spatial delay through the filter acting on the time-varying system, and outputting the compensated current position coordinates.

20 Claims, 7 Drawing Sheets

At t0+Δt, a 3D image is displayed on a display apparatus. A reverse visual phenomena happens when the spatial delay is not compensated ← Display screen
← Slit grating

(52) U.S. Cl.
CPC ........... *G06T 2207/10016* (2013.01); *G06T 2207/30201* (2013.01); *H04N 13/0409* (2013.01)

(58) Field of Classification Search
CPC ........... H04N 13/0468; H04N 13/0409; H04N 13/0438; H04N 13/0003; H04N 13/0055; H04N 13/0239; G02B 27/2264
See application file for complete search history.

(56) References Cited

U.S. PATENT DOCUMENTS

| | | | |
|---|---|---|---|
| 9,317,772 B2* | 4/2016 | Shellshear | G06K 9/4647 |
| 2004/0149036 A1* | 8/2004 | Foxlin | A61B 5/1113 |
| | | | 73/511 |
| 2007/0092110 A1* | 4/2007 | Xu | G06T 7/248 |
| | | | 382/103 |
| 2008/0004796 A1* | 1/2008 | Schott | G01C 21/005 |
| | | | 701/434 |
| 2009/0033745 A1* | 2/2009 | Yeredor | G01S 3/7864 |
| | | | 348/152 |
| 2012/0177121 A1* | 7/2012 | Tripathi | G06T 7/20 |
| | | | 375/240.16 |
| 2013/0148852 A1* | 6/2013 | Partis | G06K 9/6201 |
| | | | 382/103 |
| 2014/0369558 A1* | 12/2014 | Holz | G06K 9/00201 |
| | | | 382/103 |
| 2015/0254870 A1* | 9/2015 | Knibbe | G06T 7/20 |
| | | | 345/633 |

OTHER PUBLICATIONS

Chen Guolong, "The Research of Eye Tracking and Its Applicaton in Naked-Eye 3D Display", A Master Thesis Submitted to University of Electronic Science and Technology of China, Sep. 17, 2014 pp. 1-82.

* cited by examiner

At time t0, a sensor samples human eyes

← Display screen
← Slit grating

In Δt, a tracking algorithm calculates raw data, and human body continues moving ← Display screen
← Slit grating At t0+Δt, a 3D image is displayed on a display apparatus. A reverse visual phenomena happens when the spatial delay is not compensated ← Display screen
← Slit grating

METHOD AND APPARATUS FOR OBJECT TRACKING AND 3D DISPLAY BASED THEREON

CROSS-REFERENCES TO RELATED APPLICATIONS

This application claims priority of Chinese Application No. 201410535884.0 filed on Oct. 11, 2014, the entire contents of which are hereby incorporated by reference.

FIELD OF THE INVENTION

The present disclosure generally relates to the field of stereo display technologies and, more particularly, relates to methods and apparatuses for object tracking and 3D display based on such object tracking.

BACKGROUND

In most of current object tracking and prediction methods based on real-time videos, a possible area in which an object may appear in a next frame is predicted using a Kalman filter based on an object tracking result of a current frame. When the next frame is played, the object is searched in the predicted area of the next frame. By using the prediction result of a previous frame, the searching area of the current frame is reduced. Therefore, the amount of calculation is significantly reduced, and the tracking speed is accelerated, improving real-time object tracking.

FIG. 1 illustrates a schematic diagram of three-dimensional (3D) display apparatus. As shown in FIG. 1, the 3D display apparatus includes a head tracker 102, a tracking module 104, a display module 106, and a controllable optical system 108. The tracking module 104 may further include a calculation module 104-2 and a control module 104-4.

The head tracker 102 may be configured to track a position of a user's head. The tracking module 104 may be configured to perform calculation and control the display module 106 and the controllable optical system 108 based on the position of the user's head obtained by the head tracker 102, such that a correct image can be displayed to the user. The display module 106 may be configured to display the image under the control of the control module 104-4. The controllable optical system 108 may be configured to perform adjustment under the control of the control module 104-4, such that the correct display can be provided to the user.

FIG. 2 illustrates a schematic diagram of an object tracking sensor sampling raw data of an object at time $t_0$. As shown in FIG. 2, an object that is tracked may be a left eye and a right eye of a user. The tracked object may also be a head, a face or other parts of the user.

However, in the object tracking process based on a real-time video, an infrared detection device, a depth camera, or a wearable device, etc., due to irresistible factors (e.g., the calculation time), when the user is moving fast, a position tracking result of the tracked object obtained by a current tracking algorithm may have a certain spatial delay. FIG. 3 illustrates a schematic diagram of motion of a user during a time period $\Delta t$ of a tracking algorithm. As shown in FIG. 3, when the raw data is calculated by the current tracking algorithm in a time period $\Delta t$, the user continues to move. Therefore, there is a certain spatial delay for the object tracking result. If this object tracking result is applied to autostereoscopic 3D displays, the 3D display effect may be affected, for example, reverse visual phenomena may happen when a person moves fast.

FIG. 4 illustrates a schematic diagram of a reverse visual phenomena happened when the spatial delay is not compensated. As shown in FIG. 4, at time t0, an object (e.g., eyes) is located at position coordinates (x0, y0, z0). At this point, a camera captures an image of a user, or a sensor (e.g., an infrared sensor, a depth sensor, and so on) collects data of the tracked object, thereby obtaining raw images/data. A series of analysis and processing operations are performed using an existing tracking algorithm. At time $t0+\Delta t$, position coordinates (x0, y0, z0) of the tracked object are reported (it is assumed that the correct position of the tracked object can always be accurately calculated using the current tracking algorithm). Based on the obtained position coordinates of the tracked object, a corresponding 3D image is displayed on a display apparatus, where a left eye viewing area and a right eye viewing area of the user correspond respectively to the positions of the left eye and the right eye of the user calculated by the tracking algorithm. During this process, time consumption for processing the tracking algorithm and the arrangement algorithm is $\Delta t$. The display apparatus includes a display module and a light-splitting device, where the light-splitting device is configured to send the image displayed on the display module respectively to the left eye and the right eye of the user, such that the 3D image is displayed.

In fact, because the user may continue moving in the time period $\Delta t$, an actual position of the tracked object is changed at time $t0+\Delta t$. Therefore, the actual position of the tracked object is not at the position coordinates (x0, y0, z0), whereas the actual position of the tracked object moves to position coordinates (x', y', z') at time $t0+\Delta t$. Due to the irresistible factors (e.g., the calculation time), the position calculated by using the current tracking algorithm has a time delay $\Delta t$. The difference between the calculated position and the actual position is determined by $\Delta t$ and the moving speed of the tracked object. In this case, if no compensation for the spatial delay of the tracked object is performed during an image arrangement of the 3D display, reverse visual phenomena may happen. That is, the left eye of the user is actually located at the right eye viewing area of the 3D stereo display, and the right eye of the user is actually located at the left eye viewing area of the 3D stereo display, thereby presenting an erroneous display effect.

The disclosed methods and apparatuses are directed to solve one or more problems set forth above and other problems. For example, the disclosed methods and apparatuses can provide technical solutions for tracking a moving object in both a two-dimensional (2D) plane and a three-dimensional (3D) space, improving data accuracy of object tracking.

BRIEF SUMMARY OF THE DISCLOSURE

One aspect of the present disclosure includes an object tracking method. The method includes obtaining current position coordinates of a tracked object for a first time using a tracking algorithm and initializing a filter acting on a time-varying system based on the obtained current position coordinates. The method further includes updating a system state through the filter acting on the time-varying system when the tracking algorithm outputs new current position coordinates of the tracked object with a spatial delay, and comparing speed of the tracked object to a compensation determination threshold. Further, the method includes when the speed of the tracked object is greater than the compensation determination threshold, compensating the new current position coordinates of the tracked object with the spatial delay through the filter acting on the time-varying system, and outputting the compensated current position coordinates.

Another aspect of the present disclosure includes an object tracking apparatus. The apparatus includes an object tracking unit configured to track a position of an object to obtain current position coordinates of the tracked object. The apparatus also includes an updating and compensation unit, including a filter acting on a time-varying system, configured to initialize the filter acting on the time-varying system when the object tracking unit outputs the position coordinates of the tracked object for a first time, update a system state through the filter acting on the time-varying system when the object tracking unit outputs new current position coordinates with a spatial delay of the tracked object, and when speed of the tracked object is greater than a compensation determination threshold, provide delay compensation for the current position coordinates of the tracked object through the filter acting on the time-varying system and output the compensated current position coordinates of the tracked object.

Another aspect of the present disclosure includes a 3D display apparatus. The apparatus includes an object tracking apparatus, including an object tracking unit and an updating and compensation unit, configured to obtain current position coordinates of a tracked object, where the object tracking unit is configured to track a position of an object to obtain current position coordinates of the tracked object; and the updating and compensation unit, including a filter acting on a time-varying system, is configured to initialize the filter acting on the time-varying system when the object tracking unit outputs the position coordinates of the tracked object for a first time, update a system state through the filter acting on the time-varying system when the object tracking unit outputs new current position coordinates with a spatial delay of the tracked object, and when speed of the tracked object is greater than a compensation determination threshold, provide delay compensation for the current position coordinates of the tracked object through the filter acting on the time-varying system and output the compensated current position coordinates of the tracked object. The apparatus also includes a control module configured to control an image arrangement based on the current position coordinates and a display module configured to display an image corresponding to the image arrangement. Further, the apparatus includes a light-splitting device configured to send the image displayed by the display module to the left eye and right eye of a user, such that a 3D image is displayed.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 11:
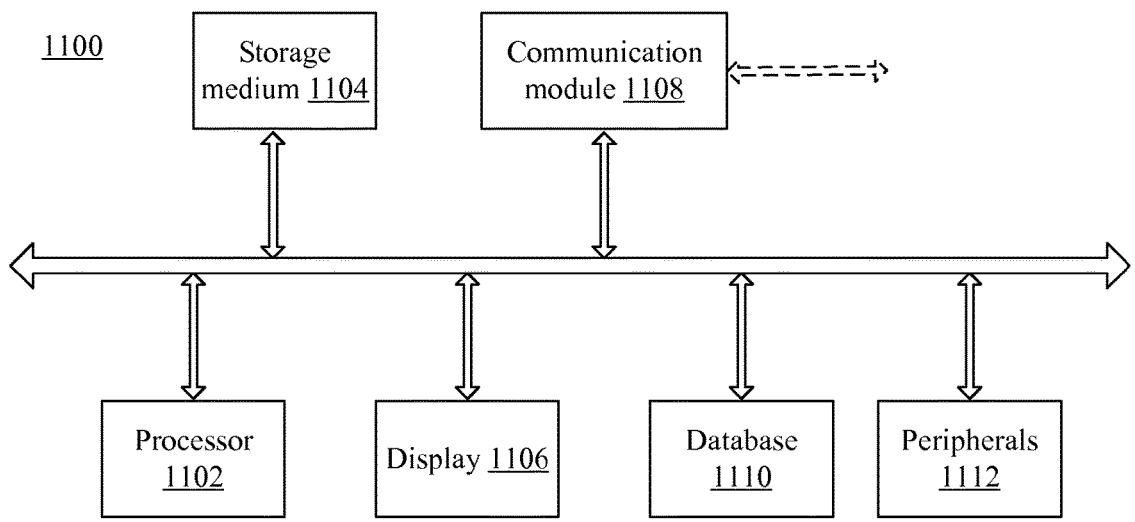
FIG. 11 illustrates an exemplary computing system consistent with the disclosed embodiments.

An object tracking apparatus may be implemented on any appropriate computing circuitry platform. FIG. 11 illustrates an exemplary computing system consistent with the disclosed embodiments. As shown in FIG. 11, the computing system 1100 may include a processor 1102, a storage medium 1104, a display 1106, a communication module 1108, a database 1110, and peripherals 1112. Certain devices may be omitted and other devices may be included.

Processor 1102 may include any appropriate processor or processors. Further, processor 1102 can include multiple cores for multi-thread or parallel processing. Storage medium 1104 may include memory modules, such as ROM, RAM, flash memory modules, and mass storages, such as CD-ROM and hard disk, etc. Storage medium 1104 may store computer programs for implementing various processes, when the computer programs are executed by processor 1102.

Further, peripherals 1112 may include various sensors and other I/O devices, such as keyboard and mouse, and communication module 1108 may include certain network interface devices for establishing connections through communication networks. Database 1110 may include one or more databases for storing certain data and for performing certain operations on the stored data, such as visual-based obstacle detection.

Figure 1:
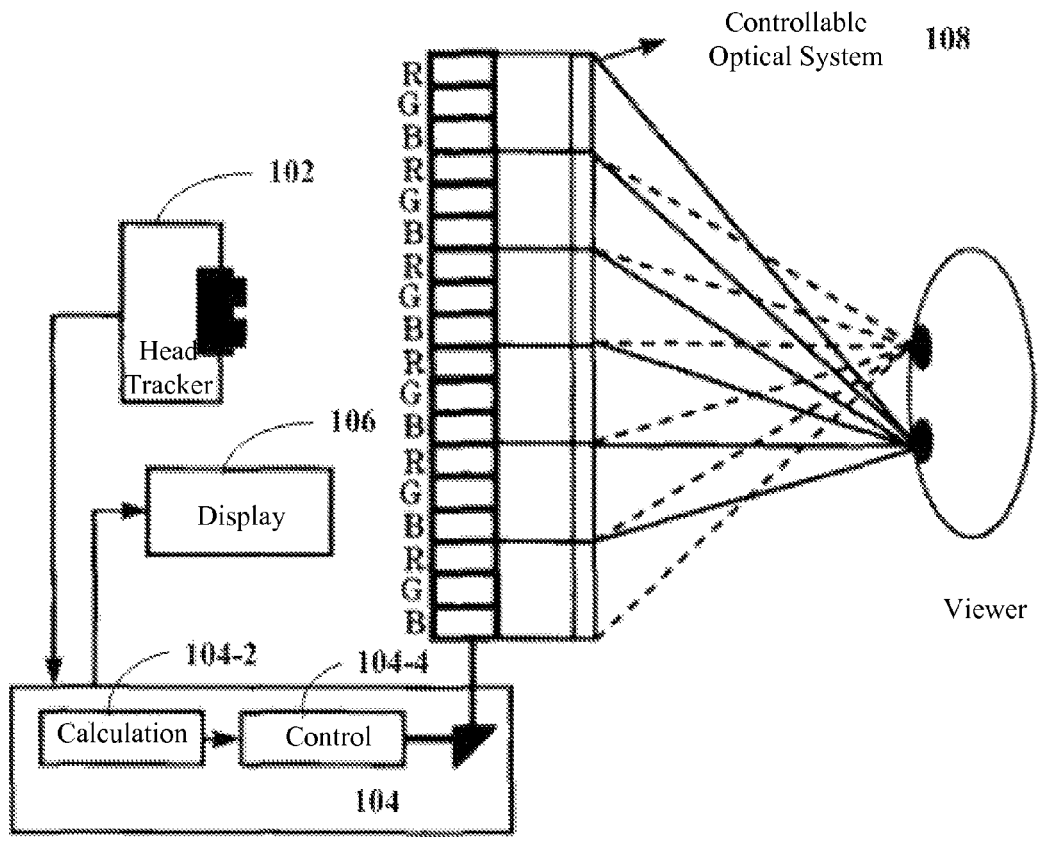
FIG. 1 illustrates a schematic diagram of 3D display apparatus.
Figure 2:
FIG. 2 illustrates a schematic diagram of an object tracking sensor sampling raw data of an object at a certain time.
Figure 3:
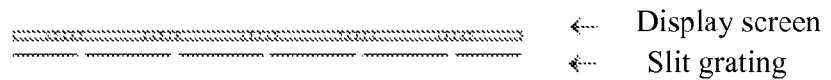
FIG. 3 illustrates a schematic diagram of motion of a user during a time period using a tracking algorithm.
Figure 3:
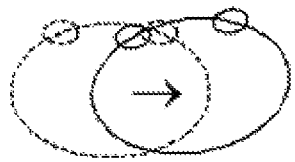
Figure 4:
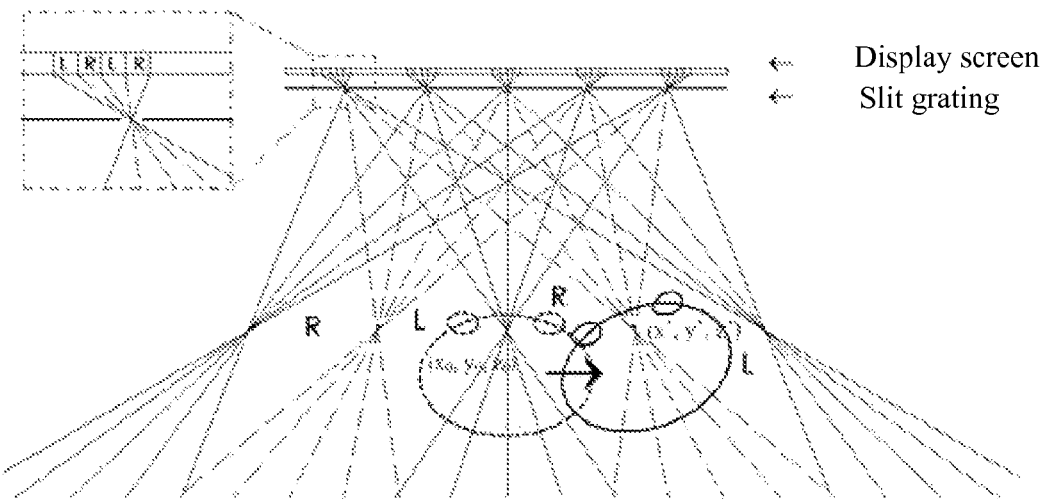
FIG. 4 illustrates a schematic diagram of a reverse visual phenomena happened when the spatial delay is not compensated.
Figure 5A:
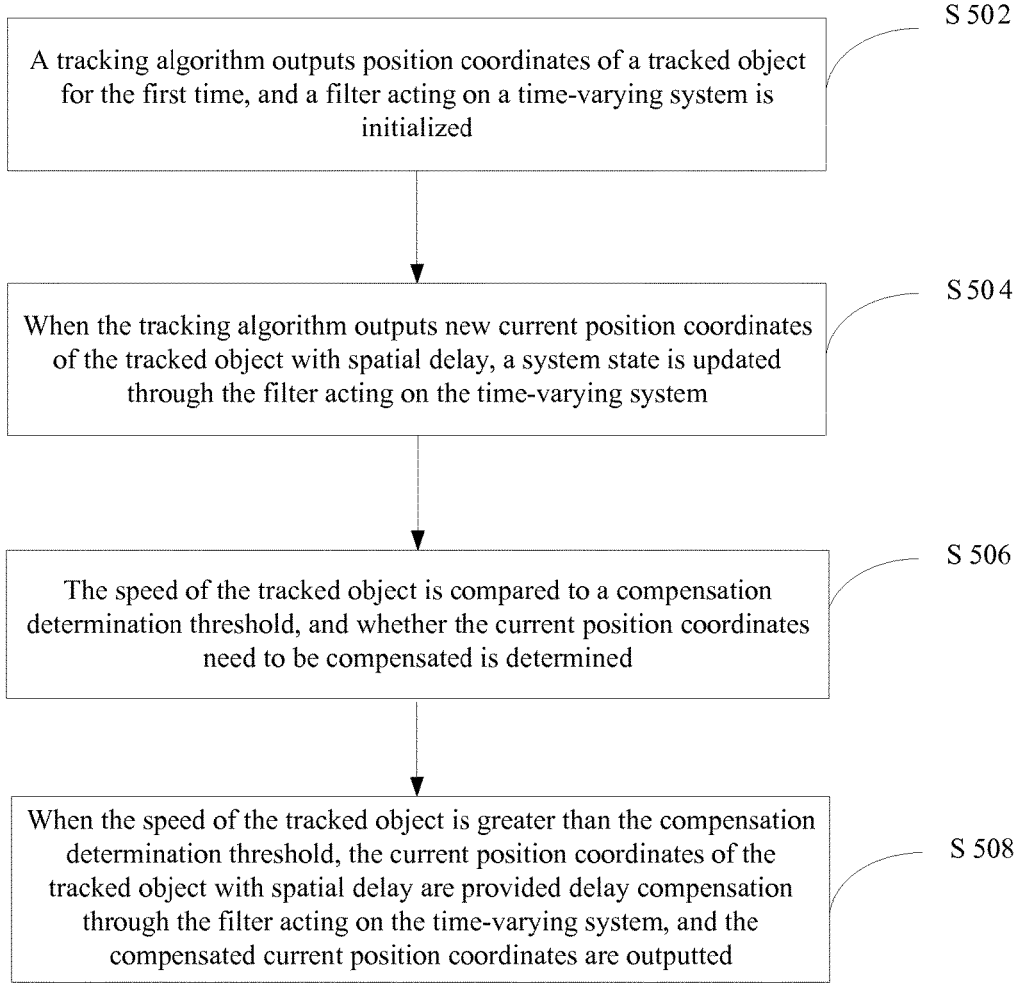
FIG. 5A illustrates a flow chart of an exemplary object tracking process consistent with the disclosed embodiments.

FIG. 5A illustrates a flow chart of an exemplary object tracking process consistent with the disclosed embodiments. As shown in FIG. 5A, the object tracking process 500 may include the following steps.

Step S502: a tracking algorithm outputs position coordinates of a tracked object for the first time, and a filter acting on a time-varying system is initialized based on the position coordinates of the tracked object.

The filter acting on the time-varying system may be a Kalman filter, a smooth filter, a Butterworth filter, a binomial coefficient filter, or a Wiener filter.

In certain embodiments, the filter acting on the time-varying system may be the Kalman filter. The Kalman filter keeps tracks of the estimated system state and the variance or uncertainty of the estimate. The Kalman filter produces estimates of actual values of measurements and their associated calculated values by predicting a value, estimating the uncertainty of the predicted value, and computing a weighted average of the predicted value and the measured value. The most weight is given to the value with the least uncertainty.

The initialization of the Kalman filter may include: initialization of a counter, a coefficient matrix of delay compensation, a sampling interval of a sensor, a posteriori estimation of system state variables, a coefficient matrix of system state transition, a noise gain matrix of the system state, a noise covariance matrix of the system state, a measurement coefficient matrix, a measurement noise covariance matrix, and an error covariance matrix of the posteriori estimation of the system state variables.

Step S504: when the tracking algorithm outputs new current position coordinates of the tracked object with a spatial delay, the system state is updated through the filter acting on the time-varying system.

For example, the Kalman filter, in combination with a strong tracking filter, can update the system state and provide delay compensation for the current position coordinates of the tracked object. The strong tracking filter may be a strong tracking filter with multiple suboptimal fading factors. The strong tracking filter needs to be initialized before the strong tracking filter is used. Specifically, the initialization of the strong tracking filter includes: initialization of a proportional coefficient of the multiple suboptimal fading factors, a forgetting factor of the strong tracking filter, and a weakening factor of the strong tracking filter.

Figure 5B:
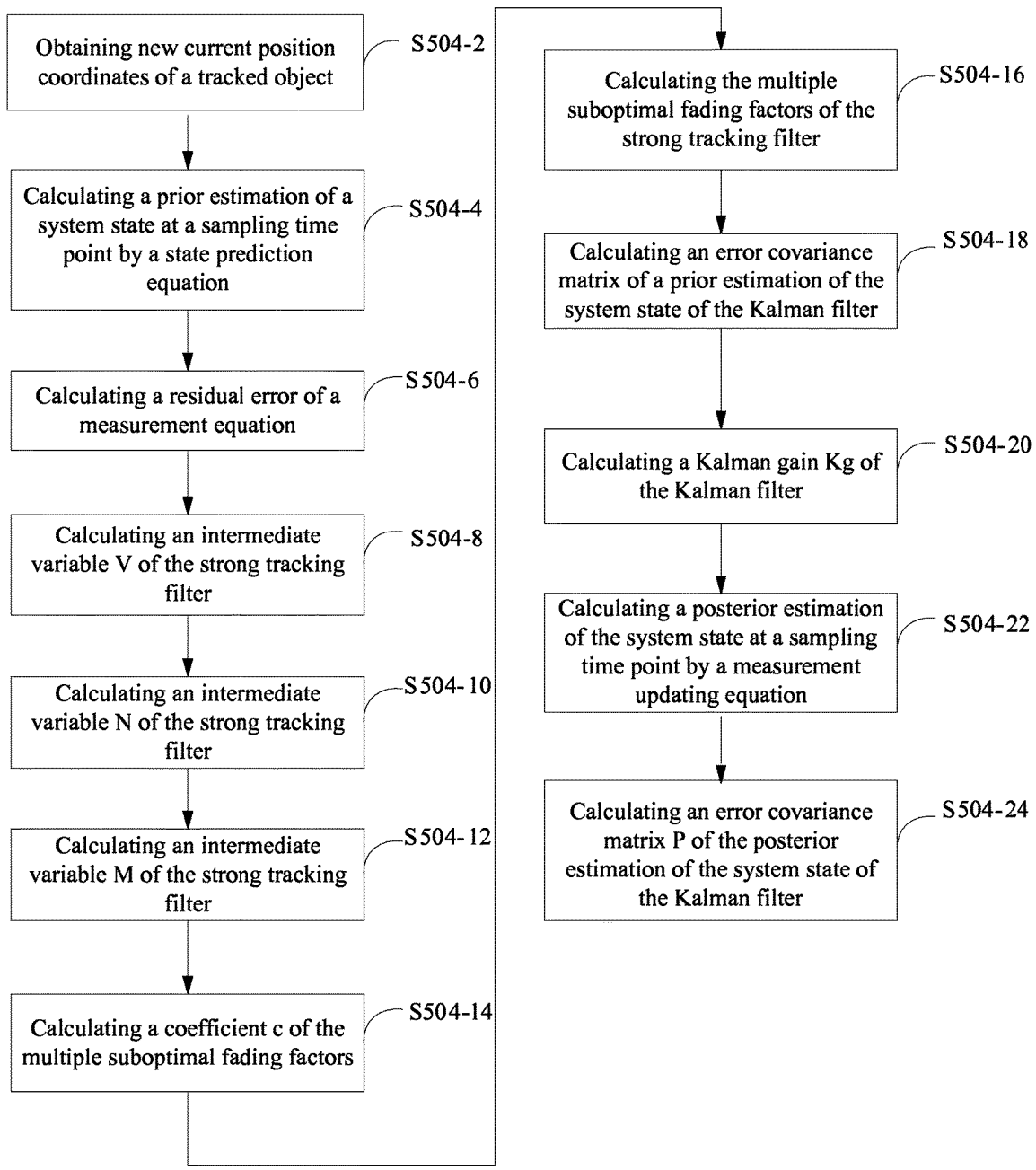
FIG. 5B illustrates a flow chart of another exemplary object tracking process consistent with the disclosed embodiments.

Further, in Step S504, the system state can be updated through the Kalman filter and the strong tracking filter. FIG. 5B illustrates a flow chart of another exemplary object tracking process consistent with the disclosed embodiments. When the Kalman filter and the strong tracking filter are used to update the system state, the process may include the following steps.

Step S504-2: new current position coordinates of a tracked object are obtained.

In Step S504-2, multiple predetermined object tracking methods can be used to obtain the current position coordinates of the tracked object.

Step S504-4: based on the current position coordinates, a priori estimation $\hat{X}_-$ of the system state at a sampling time point is calculated by a state prediction equation.

Step S504-6: a residual error γ of a measurement equation is calculated using the priori estimation $\hat{X}_-$.

Step 504-8: an intermediate variable V of the strong tracking filter is calculated using the residual error γ.

Step S504-10: an intermediate variable N of the strong tracking filter is calculated using the intermediate variable V.

Step S504-12: an intermediate variable M of the strong tracking filter is calculated using the intermediate variable N.

Step S504-14 a coefficient c of the multiple suboptimal fading factors is calculated using the intermediate variable M.

Step S504-16: the multiple suboptimal fading factors $\lambda_i$ of the strong tracking filter is calculated using the coefficient c of the multiple suboptimal fading factors.

Step S504-18: an error covariance matrix P_ of a priori estimation of the system state of the Kalman filter is calculated using the multiple suboptimal fading factors $\lambda_i$ of the strong tracking filter.

Step S504-20: a Kalman gain Kg of the Kalman filter is calculated using the error covariance matrix P_ of a priori estimation of the system state.

Step S504-22: using Kalman gain Kg, a posteriori estimation $\hat{X}$ of the system state at a sampling time point is calculated by a measurement updating equation.

Step S504-24: an error covariance matrix P of the posteriori estimation of the system state of the Kalman filter is calculated using the posteriori estimation $\hat{X}$.

Returning to FIG. 5A, after completion of Step 504, the process goes to Step S506.

Step S506: the speed of the tracked object is compared to a compensation determination threshold, and whether the current position coordinates need to be compensated is determined.

Step S508: when the speed of the tracked object is greater than the compensation determination threshold, the current position coordinates of the tracked object with the spatial delay are provided delay compensation through the filter acting on the time-varying system, and the compensated current position coordinates are outputted.

The compensation for the current position coordinates of the tracked object with the spatial delay performed by the Kalman filter and the strong tracking filter may include the following.

Based on the above calculated parameters, the compensated current position coordinates of the tracked object are calculated by:

$$\begin{pmatrix} x_{real} \\ y_{real} \\ z_{real} \end{pmatrix} = \begin{cases} S * \hat{X}, & \|vx, vy, vz\| \geq \tau \\ (x, y, z)^T, & \|vx, vy, vz\| < \tau \end{cases} \quad (1)$$

wherein ($x_{real}$, $y_{real}$, $z_{real}$) are the compensated current position coordinates of the tracked object; (x, y, z) are the position coordinates in the posteriori estimation $\hat{X}$ of the Kalman filter; $\|(vx, vy, vz)\|$ is 2-norm of a speed value (vx, vy, vz); S is a coefficient matrix of the delay compensation; and τ is a compensation determination threshold, and τ>0.

The current position coordinates of the tracked object may be three-dimensional (3D) coordinates or two-dimensional (2D) coordinates. The above current position coordinates are the 3D coordinates. When the 2D coordinates are used, the 3D coordinates can be converted to the 2D coordinates.

In certain embodiments, the filter acting on the time-varying system may be used to filter noise for the current position coordinates, greatly reducing calculation error and system noise of the tracking algorithm, and removing data jilter in the current position coordinates of the tracked object. The usage of the multiple suboptimal fading factors of the strong tracking filter improves the tracking performance of the filter acting on the time-varying system for a moving object. Therefore, the system state variables of an actual motion state at a time point which is the closest time point for obtaining the current position of the tracked object can be obtained.

Figure 6:
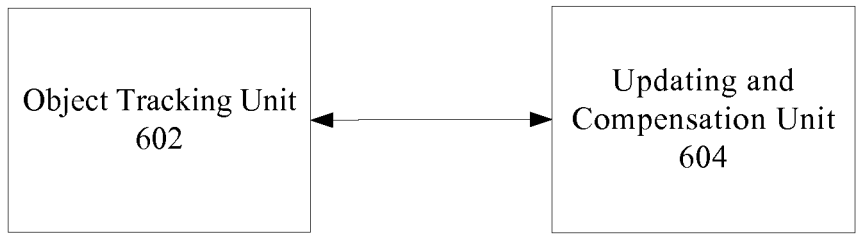
FIG. 6 illustrates a structure diagram of an exemplary object tracking apparatus consistent with the disclosed embodiments.

FIG. 6 illustrates a structure diagram of an exemplary object tracking apparatus consistent with the disclosed embodiments. As shown in FIG. 6, the object tracking apparatus 600 may include an object tracking unit 602, and an updating and compensation unit 604. Certain units may be omitted and other units may be included.

The object tracking unit 602 may be configured to track a position of an object to obtain current position coordinates of the tracked object.

The updating and compensation unit 604 includes a filter acting on a time-varying system. When the object tracking unit 602 outputs the position coordinates of the tracked object for the first time, the updating and compensation unit 604 may be configured to initialize the filter acting on the time-varying system. When the object tracking unit 602 outputs new current position coordinates with a spatial delay of the tracked object, the updating and compensation unit 604 may be configured to update the system state through the filter acting on the time-varying system. When the speed of the tracked object is greater than a compensation determination threshold, the updating and compensation unit 604 may be configured to compensate the current position coordinates of the tracked object through the filter acting on the time-varying system and output the compensated current position coordinates of the tracked object.

The filter acting on the time-varying system may be a Kalman filter, a smooth filter, a Butterworth filter, a binomial coefficient filter, or a Wiener filter.

When the filter acting on the time-varying system used herein is the Kalman filter, the Kalman filter may be initialized based on the current position coordinates obtained by the object tracking unit 602 for the first time. The initialization of the Kalman filter includes: initialization of a counter, a coefficient matrix of delay compensation, a sampling interval of a sensor, a posteriori estimation of system state variables, a coefficient matrix of system state transition, a noise gain matrix of the system state, a noise covariance matrix of the system state, a measurement coefficient matrix, a measurement noise covariance matrix, and an error covariance matrix of the posteriori estimation of the system state variables.

The updating and compensation unit 604 updates the system state through the Kalman filter and a strong tracking filter and provides delay compensation for the current position coordinates of the tracked object. The strong tracking filter may be a strong tracking filter with multiple suboptimal fading factors. The strong tracking filter needs to be initialized before used. Specifically, the initialization of the strong tracking filter includes: initialization of a proportional coefficient of the multiple suboptimal fading factors, a forgetting factor of the strong tracking filter, and a weakening factor of the strong tracking filter.

The current position coordinates are updated by the updating and compensation unit 604 using the Kalman filter and the strong tracking filter, details of which are described in the followings.

The current position coordinates are obtained from the object tracking unit. Based on the current position coordinates, a priori estimation $\hat{X}_-$ of the system state at a sampling time point is calculated by a state prediction equation. A residual error $\gamma$ of a measurement equation is calculated using the priori estimation $\hat{X}_-$. An intermediate variable V of the strong tracking filter is calculated using the residual error $\gamma$. An intermediate variable N of the strong tracking filter is calculated using the intermediate variable V. An intermediate variable M of the strong tracking filter is calculated using the intermediate variable N. A coefficient c of the multiple suboptimal fading factors is calculated using the intermediate variable M. The multiple suboptimal fading factors $\lambda_i$ of the strong tracking filter is calculated using the coefficient c of the multiple suboptimal fading factors. An error covariance matrix P_ of a priori estimation of the system state of the Kalman filter is calculated using the multiple suboptimal fading factors $\lambda_i$ of the strong tracking filter. A Kalman gain Kg of the Kalman filter is calculated using the error covariance matrix P_ of the priori estimation of the system state. Using Kalman gain Kg, a posteriori estimation $\hat{X}$ of the system state at a sampling time point is calculated by a measurement updating equation. An error covariance matrix P of the posteriori estimation of the system state of the Kalman filter is calculated using the posteriori estimation $\hat{X}$.

The current position coordinates of the tracked object are provided delay compensation by the updating and compensation unit 604 using the Kalman filter and the strong tracking filter, details of which are described in the followings.

Based on the above calculated parameters, the compensated current position coordinates of the tracked object are calculated by:

$$\begin{pmatrix} x_{real} \\ y_{real} \\ z_{real} \end{pmatrix} = \begin{cases} S * \hat{X}, \|vx, vy, vz\| \geq \tau \\ (x, y, z)^T, \|vx, vy, vz\| < \tau \end{cases}, \quad (1)$$

wherein ($x_{real}$, $y_{real}$, $z_{real}$) are the compensated current position coordinates of the tracked object; (x, y, z) are the position coordinates in the posteriori estimation $\hat{X}$ of the Kalman filter; $\|(vx, vy, vz)\|$ is 2-norm of speed values (vx, vy, vz); S is a coefficient matrix of the delay compensation; and $\tau$ is a compensation determination threshold, and $\tau>0$.

In certain embodiments, the updating and compensation unit 604 uses the filter acting on the time-varying system to filter noise for the current position coordinates, greatly reducing calculation error and system noise of a tracking algorithm, and removing data jilter in the current position coordinates of the tracked object. The usage of the multiple suboptimal fading factors of the strong tracking filter improves the tracking performance of the filter acting on the time-varying system for a moving object. Therefore, the system state variables of an actual motion state at a time point which are the closest time point for obtaining the current position of the tracked object can be obtained.

Figure 7:
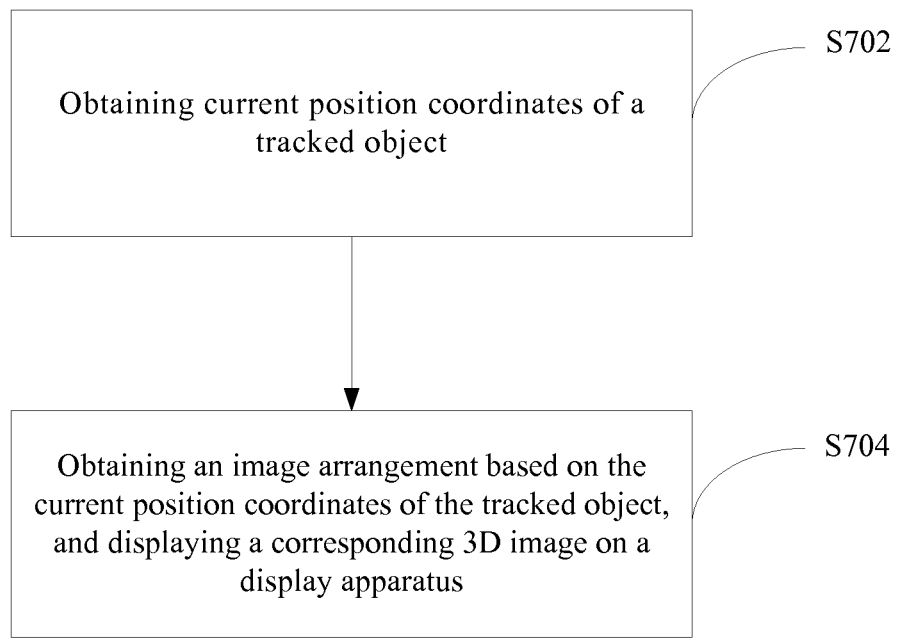
FIG. 7 illustrates a flow chart of an exemplary 3D display process consistent with the disclosed embodiments.

FIG. 7 illustrates a flow chart of an exemplary 3D display process consistent with the disclosed embodiments. As shown in FIG. 7, the 3D display process 700 may include the following steps.

Step S702: current position coordinates of a tracked object are obtained. Specifically, the current position coordinates of the tracked object may be obtained by using the object tracking process 500 shown in FIG. 5A, details of which are not repeated herein.

Step S704: an image arrangement is obtained based on the current position coordinates of the tracked object, and a corresponding 3D image is displayed to a user on a display apparatus. The display apparatus may include a display module and a light-splitting device. The image displayed by the display module is sent to the left eye and right eye of the user through the light-splitting device, thereby displaying the 3D image.

Figure 8:
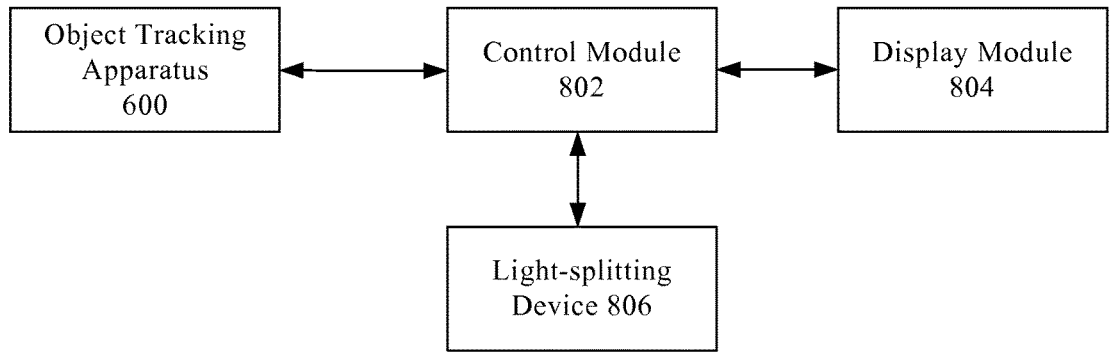
FIG. 8 illustrates a structure schematic diagram of an exemplary 3D display apparatus consistent with the disclosed embodiments.

FIG. 8 illustrates a structure schematic diagram of an exemplary 3D display apparatus consistent with the disclosed embodiments. As shown in FIG. 8, the display apparatus 800 may include an object tracking apparatus 600, a control module 802, a display module 804, and a light-splitting device 806. Certain modules may be omitted and other modules may be included.

The object tracking apparatus 600 may be configured to obtain current position coordinates of a tracked object. The structure of the object tracking apparatus 600 may include those described with respect to FIG. 6.

The control module 802 may be configured to control an image arrangement based on the current position coordinates. The display module 804 may be configured to display an image corresponding to the image arrangement. The light-splitting device 806 may be configured to send the image displayed by the display module 804 to the left eye and right eye of a user, such that a 3D image is displayed. The light-splitting device 806 may be a liquid crystal lens, a liquid crystal microlens, a microlens array, or a slit grating.

Further, more specifically, in certain embodiments, the compensation algorithm in the object tracking process for delay compensation may include the following steps.

At the beginning, in the object tracking process based on real-time videos, an infrared detection device, a depth camera, or a wearable device, a sensor continuously samples signals at a same time interval, and a series of image/data frames are formed. Assuming that the time needed for calculating each image/data frame using a tracking algorithm is the same, the position of the tracked object obtained by calculating each frame has a same time delay Δt.

1. Initialization of the Compensation Algorithm.

Original sampling data at time point t0 is calculated using the current tracking algorithm to obtain position coordinates (x0, y0, z0) of a tracked object. The initialization is performed after the tracking algorithm completes the processing of the first image/data frame and outputs the first group position coordinates (x0, y0, z0) of the tracked object. The initialization process may include the initialization of the following values.

1.1 Initialization of a Kalman Filter.

K=0, a counter is initialized.

A coefficient matrix S of delay compensation is represented by:

$$S = \begin{pmatrix} S' & O_{1*3} & O_{1*3} \\ O_{1*3} & S' & O_{1*3} \\ O_{1*3} & O_{1*3} & S' \end{pmatrix} \quad (2)$$

wherein $O_{1*3}$=(0 0 0); S'=(1 Δt (Δt)²/2); and Δt is a time delay caused by irresistible factors (e.g., calculation time).

When k=0, a posteriori estimation $\hat{X}$ of the system state (x, vx, ax, y, vy, ay, z, vz, az) is initialized as an initial state and represented by:

$$\hat{X} = (x_0, 0, 0, y_0, 0, 0, z_0, 0, 0)^T, \quad (3)$$

wherein (x0, y0, z0) is the position coordinates of the tracked object outputted by the tracking algorithm for the first time; vx, vy and vz are speeds on directions x, y and z, respectively; ax, ay and az are accelerations on the directions x, y and z, respectively; and x, vx, ax, y, vy, ay, z, vz, and az are initialized to 0.

A coefficient matrix A of the system state transition is represented by:

$$A = \begin{pmatrix} A' & O_3 & O_3 \\ O_3 & A' & O_3 \\ O_3 & O_3 & A' \end{pmatrix} \quad (4)$$

wherein $$O_3 = \begin{pmatrix} 0 & 0 & 0 \\ 0 & 0 & 0 \\ 0 & 0 & 0 \end{pmatrix}; \quad A' = \begin{pmatrix} 1 & T & T^2/2 \\ 0 & 1 & T \\ 0 & 0 & 1 \end{pmatrix};$$

and T is a sample interval of a sensor (for example, if the sampling rate of the sensor is 30 FPS, T=(1/30)s).

A noise gain matrix G of the system state is represented by:

$$G = \begin{pmatrix} G' & O_{3*1} & O_{3*1} \\ O_{3*1} & G' & O_{3*1} \\ O_{3*1} & O_{3*1} & G' \end{pmatrix}, \quad (6)$$

wherein $$O_{3*1} = \begin{pmatrix} 0 \\ 0 \\ 0 \end{pmatrix}; \quad G' = \begin{pmatrix} T^2/2 \\ T \\ 1 \end{pmatrix};$$

and T is a sample interval of a sensor.

A noise covariance matrix Q of the system state is a covariance matrix of acceleration noise (i.e., a diagonal matrix). The noise covariance matrix Q of the system state is represented by:

$$Q = \begin{pmatrix} q_{11} & 0 & 0 \\ 0 & q_{22} & 0 \\ 0 & 0 & q_{33} \end{pmatrix}, \quad (6)$$

wherein $q_{11}$, $q_{22}$ and $q_{33}$>0; and $q_{11}$, $q_{22}$ and $q_{33}$ correspond to noise variance of the acceleration ax, ay, and az, respectively. It should be noted that q11, q22 and q33 may be selected correspondingly based on the intensity of changes in the accelerations.

A measurement coefficient matrix H is represented by:

$$H = \begin{pmatrix} 1 & 0 & 0 & 0 & 0 & 0 & 0 & 0 & 0 \\ 0 & 0 & 0 & 1 & 0 & 0 & 0 & 0 & 0 \\ 0 & 0 & 0 & 0 & 0 & 0 & 1 & 0 & 0 \end{pmatrix}. \quad (7)$$

R is a measurement noise covariance matrix, that is, an error covariance matrix (a diagonal matrix) of the position of the tracked object outputted by the tracking algorithm. The measurement noise covariance matrix is represented by:

$$R = \begin{pmatrix} r_{11} & 0 & 0 \\ 0 & r_{22} & 0 \\ 0 & 0 & r_{33} \end{pmatrix}, \quad (8)$$

wherein $r_{11}$, $r_{22}$, and $r_{33}$>0; and $r_{11}$, $r_{22}$, and $r_{33}$ correspond respectively to the error covariance of the object position x, y, z calculated by the tracking algorithm. It should be noted that $r_{11}$, $r_{22}$, and $r_{33}$ may be selected correspondingly based on actual error of the tracking algorithm.

P is an error covariance matrix of the posteriori estimation of the system state of the Kalman filter. The error covariance matrix of the posteriori estimation of the system state of the Kalman filter is represented by:

$$P = \mathrm{diag}(p_{11}, p_{12}, \ldots, p_{99}), \quad (9)$$

wherein $p_{11}, p_{12}, \ldots p_{99} > 0$ and correspond respectively to the error covariance of a priori estimation of the system state variables (x, vx, ax, y, vy, ay, z, vz, az); and when P is initialized, the values of $p_{11}$, $p_{44}$ and $p_{77}$ can be selected as smaller values (corresponding respectively to x, y, z), whereas other $p_{ii}$ values can be selected as bigger values.

1.2 Initialization of a Strong Tracking Filter with Multiple Suboptimal Fading Factors as Follows.

$\alpha = (\alpha_1, \alpha_2, \ldots, \alpha_9)$ is a proportional coefficient of the multiple suboptimal fading factors, wherein $\alpha_i \geq 1$ and correspond respectively to the rate of change of the system state variables (x, vx, ax, y, vy, ay, z, vz, az); if it is known from experience that the jth state variable among this group of state variables may have a sudden change, the value of $\alpha_j$ may be increased accordingly; if there is no experience to follow, the value of $\alpha_i$ may be set as $\alpha_i = 1$, i=1, 2, . . . , 9; at this time, the multiple suboptimal fading factors are degenerated into a single suboptimal fading factor.

$\rho$: $0 < \rho \leq 1$, and $\rho$ is a forgetting factor of the strong tracking filter. In general, $\rho = 0.95$.

$\beta$: $\beta \geq 1$, and $\beta$ is a weakening factor of the strong tracking filter, and the purpose of the weakening factor is to make a filtering result smoother. $\beta$ is selected based on actual needs.

1.3 Setting a Compensation Determination Threshold as Follows.

$\tau$: $\tau > 0$, and $\tau$ is a compensation determination threshold. When the moving speed of the object is greater than or equal to the compensation determination threshold, it indicates that the object moves too fast and the compensation algorithm needs to be performed for the tracking result of the object. When the speed of the object is less than the compensation determination threshold, it indicates that the object does not move or moves slowly, and the tracking result of the object is not compensated.

2. Compensating for a Tracking Delay Using the Kalman Filter and the Strong Tracking Filter.

Figure 9:
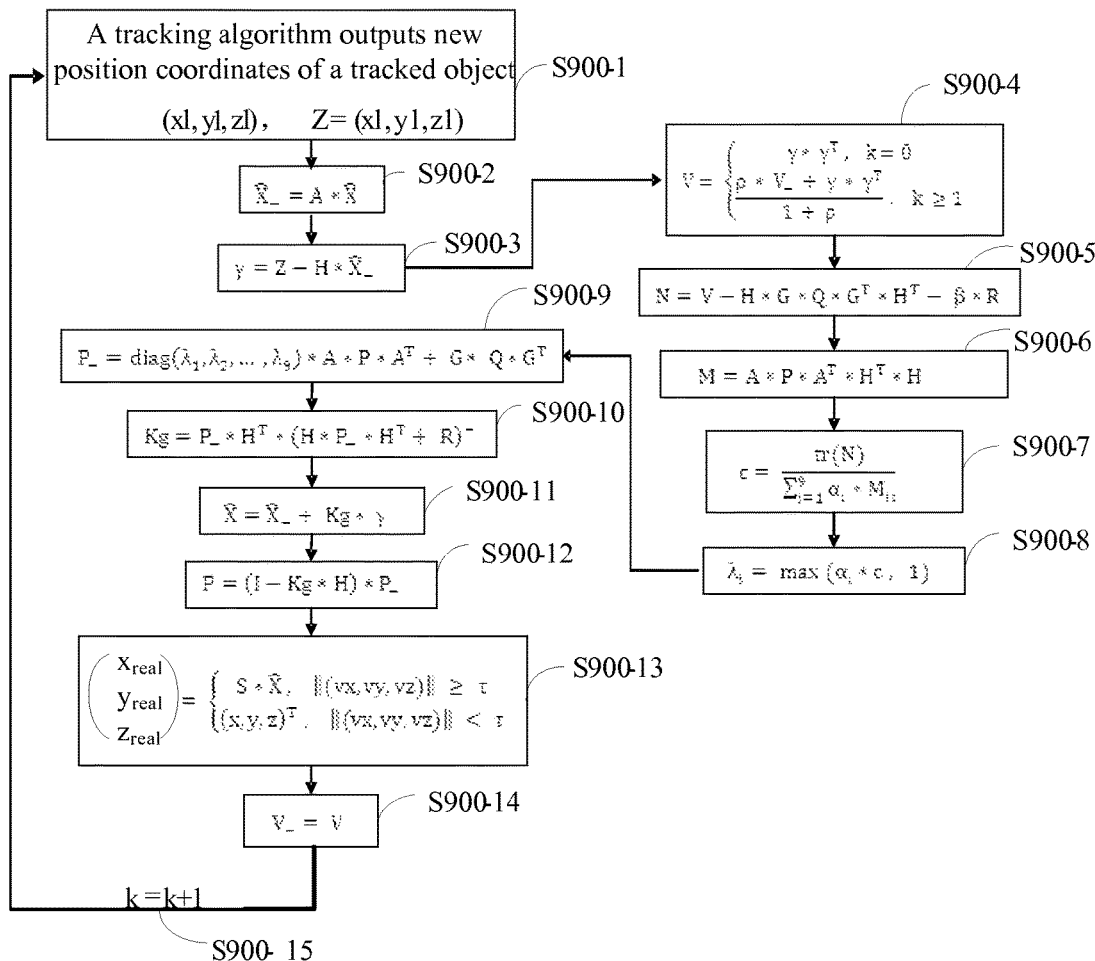
FIG. 9 illustrates a flow chart of an exemplary tracking algorithm based on a Kalman filter and a strong tracking filter.

When the tracking algorithm outputs the data of the second frame and the data of the following frames, the tracking algorithm performs compensation for the tracking delay using the Kalman filter and the strong tracking filter. FIG. 9 illustrates a flow chart of an exemplary tracking algorithm based on a Kalman filter and a strong tracking filter. As shown in FIG. 9, the process may include the following steps.

Step S900-1: a tracking algorithm re-outputs a group of position coordinates (x1, y1, z1) of the tracked object, Z=(x1, y1, z1). Z is a measurement value of the current tracked object.

Step S900-2: based on the obtained position coordinates (x1, y1, z1), a priori estimation $\hat{X}_-$ of the system state variables (x, vx, ax, y, vy, ay, z, vz, az) at a sampling time point is calculated by a state prediction equation $\hat{X}_- = A*\hat{X}$, wherein A is a coefficient matrix of the system state transition, and $\hat{X}$ is a posteriori estimation of the system state (x, vx, ax, y, vy, ay, z, vz, az).

Step S900-3: a residual error $\gamma$ of a measurement equation is calculated by $\gamma = Z - H*\hat{X}_-$, wherein Z is a measurement value of the current tracked object; $\hat{X}_-$ is a priori estimation of the system state variables (x, vx, ax, y, vy, ay, z, vz, az) at a sampling time point; and H is a measurement coefficient matrix.

Step S900-4: an intermediate variable V of the strong tracking filter is calculated by $$V = \begin{cases} \gamma*\gamma^T, & k=0 \\ \dfrac{\rho*V_- + \gamma*\gamma^T}{1+\rho} & k \geq 1 \end{cases},$$

wherein $\gamma$ is a residual error of the measurement equation; $\rho$ is a forgetting factor of the strong tracking filter, and $V_-$ is a V value of a previous strong filtering-Kalman filtering cycle.

Step S900-5: an intermediate variable N of the strong tracking filter is calculated by $N = V - H*G*Q*G^T*H^T - \beta*R$, wherein V is an intermediate variable of the strong tracking filter; H is a measurement coefficient matrix; R is a measurement noise covariance matrix; G is a noise gain matrix of the system state; Q is a noise covariance matrix of the system state; and $\beta$ is a weakening factor of the strong tracking filter.

Step S900-6: an intermediate variable M of the strong tracking filter is calculated by $M = A*P*A^T*H^T*H$, wherein H is a measurement coefficient matrix; A is a coefficient matrix of the system state transition; and P is an error covariance matrix of the posteriori estimation of the system state of the Kalman filter.

Step S900-7: a coefficient c of the multiple suboptimal fading factors is calculated by $$c = \frac{tr(N)}{\sum_{i=1}^{9} \alpha_i * M_{ii}},$$

wherein N is an intermediate variable of the strong tracking filter; tr(N) is to calculate a trace of the matrix N, that is, a sum of diagonal elements of the matrix N; $\alpha = (\alpha_1, \alpha_2, \ldots, \alpha_9)$ is a proportional coefficient of the multiple suboptimal fading factors; $\alpha_i$ is each element of $\alpha$; M is an intermediate variable of the strong tracking filter; and $M_{ii}$ is each diagonal element of the matrix M, and i=1, 2, . . . , 9.

Step S900-8: the multiple suboptimal fading factors $\lambda_i$ of the strong tracking filter are calculated by $\lambda_i = \max(\alpha_i*c, 1)$, wherein c is a coefficient c of the multiple suboptimal fading factors; and i=1, 2, . . . , 9, and $(\lambda 1, \lambda 2, \ldots, \lambda 9)$ are multiple suboptimal fading factors of the strong tracking filter.

Step S900-9: an error covariance matrix $P_-$ of a priori estimation of the system state of the Kalman filter is calculated by $P_- = \mathrm{diag}(\lambda_1, \lambda_2, \ldots \lambda_9)*A*P*A^T + G*Q*G^T$, wherein A is a coefficient matrix of the system state transition; P is an error covariance matrix of the posteriori estimation of the system state of the Kalman filter; G is a noise gain matrix of the system state; Q is a noise covariance matrix of the system state; and a $\mathrm{diag}(\lambda 1, \lambda 2, \ldots, \lambda 9)$ represents to generate a 9*9 diagonal matrix (i.e., the diagonal elements are $\lambda 1, \lambda 2, \ldots, \lambda 9$, respectively, and other elements are 0).

Step S900-10: a Kalman gain Kg of the Kalman filter is calculated by $Kg = P_-*H^T*(H*P_-*H^T + R)^-$, wherein $P_-$ is an error covariance matrix of a priori estimation of the system state; H is a measurement coefficient matrix; R is a measurement noise covariance matrix; and "−" represents to calculate inverse of a matrix.

Step S900-11: a posteriori estimation $\hat{X}$ of the system state variables (x, vx, ax, y, vy, ay, z, vz, az) at a sampling time point is calculated by $\hat{X}=\hat{X}_-+Kg*\gamma$, wherein $\hat{X}_-$ is a priori estimation of the system state variables (x, vx, ax, y, vy, ay, z, vz, az) at a sampling time point; Kg is a Kalman gain of the Kalman filter; and γ is a residual error of a measurement equation.

Step S900-12: an error covariance matrix P of the posteriori estimation of the system state of the Kalman filter is calculated by $P=(1-Kg*H)*P_-$, wherein $P_-$ is an error covariance matrix of a priori estimation of the system state; H is a measurement coefficient matrix; and Kg is a Kalman gain of the Kalman filter.

Step S900-13: actual position coordinates ($x_{real}$, $y_{real}$, $z_{real}$) of the tracked object are obtained after the position coordinates (x1, y1, z1) outputted by the tracking algorithm are filtered and compensated.

The actual position coordinates ($x_{real}$, $y_{real}$, $z_{real}$) of the tracked object are calculated by $$\begin{pmatrix} x_{real} \\ y_{real} \\ z_{real} \end{pmatrix} = \begin{cases} S*\hat{X}, & \|vx, vy, vz\| \geq \tau \\ (x, y, z)^T, & \|vx, vy, vz\| < \tau \end{cases},$$

wherein S is a coefficient matrix of the delay compensation; $\hat{X}$ is a posteriori estimation; (x, y, z) are position coordinates in the posteriori estimation $\hat{X}$ of the Kalman filter; and $\|(vx, vy, vz)\|$ is 2-norm of speed values (vx, vy, vz), that is, the moving speed of the object; τ is a compensation determination threshold, and τ>0.

When the moving speed is greater than and equal to a preset compensation determination threshold τ, the tracking result is compensated; otherwise, the position value (x, y, z) in the posteriori estimation $\hat{X}$ of the Kalman filter is obtained. Alternatively, based on the position, speed and acceleration information in $\hat{X}$, in combination with a time delay Δt, the actual position of the object at t0+Δt can be calculated by $$\begin{cases} x_{real} = x + vx*\Delta t + ax*\Delta t^2/2 \\ y_{real} = y + vy*\Delta t + ay*\Delta t^2/2 \\ z_{real} = z + vz*\Delta t + az*\Delta t^2/2 \end{cases}.$$

Step S900-14: the value of $V_-$ is updated by $V_-=V$. $V_-$ is a V value of the previous strong filtering-Kalman filtering cycle.

Step S900-15: k=k+1. That is, k is increased by 1. Afterwards, the process returns to Step S900-1.

The representations of all the variables are simplified above, so that those skilled in the art can have a clear understanding about the disclosure. It should be noted that, in practical algorithms, k value needs to be set according to the cycle.

The above algorithm may be applied to a 3D tracking compensation process of the tracked object. If only the 2D position of the tracked object needs to calculated, the parameters are shown in the following.

A coefficient matrix of delay compensation is represented by:

$$S = \begin{pmatrix} S' & O_{1*3} \\ O_{1*3} & S' \end{pmatrix}.$$

When k=0, a posteriori estimation $\hat{X}$ of the system state (x, vx, ax, y, vy, ay) is initialized as an initial state and represented by:

$$\hat{X}=(x_0,0,0,y_0,0,0)^T,$$

wherein (x0, y0) is the position coordinates of the tracked object outputted by the tracking algorithm for the first time; vx, and vy are speeds on directions x, and y, respectively; ax, and ay are accelerations on the directions x, and y, respectively; and x, vx, ax, y, vy, and ay are initialized to 0.

A coefficient matrix of the system state transition is represented by:

$$A = \begin{pmatrix} A' & O_3 \\ O_3 & A' \end{pmatrix}.$$

A noise gain matrix of the system state is represented by:

$$G = \begin{pmatrix} G' & O_{3*1} \\ O_{3*1} & G' \end{pmatrix}.$$

A noise covariance matrix of the system state is a covariance matrix of acceleration noise (i.e., a diagonal matrix). The noise covariance matrix of the system state is represented by:

$$Q = \begin{pmatrix} q_{11} & 0 \\ 0 & q_{22} \end{pmatrix},$$

wherein $q_{11}$ and $q_{22}$>0; and $q_{11}$ and $q_{22}$ correspond to noise variance of the acceleration ax and ay, respectively. It should be noted that q11 and q22 may be selected correspondingly based on the intensity of changes in the accelerations.

A measurement coefficient matrix is represented by:

$$H = \begin{pmatrix} 1 & 0 & 0 & 0 & 0 & 0 \\ 0 & 0 & 0 & 1 & 0 & 0 \end{pmatrix}.$$

R is a measurement noise covariance matrix, that is, an error covariance matrix (a diagonal matrix) of the position of the tracked object outputted by the tracking algorithm. The measurement noise covariance matrix is represented by:

$$R = \begin{pmatrix} r_{11} & 0 \\ 0 & r_{22} \end{pmatrix},$$

wherein $r_{11}$ and $r_{22}$>0; and $r_{11}$ and $r_{22}$ correspond respectively to the error covariance of the object position x, y calculated by the tracking algorithm. It should be noted that $r_{11}$, and $r_{22}$ may be selected correspondingly based on actual error of the tracking algorithm.

P is an error covariance matrix of the posteriori estimation of the system state of the Kalman filter. The error covariance matrix of the posteriori estimation of the system state of the Kalman filter is represented by:

$$P=\text{diag}(p_{11},p_{22},\ldots,p_{66}),$$

wherein $p_{11}, p_{12}, \ldots, p_{66}>0$ and correspond respectively to the error covariance of a priori estimation of the system state variables (x, vx, ax, y, vy, ay); and when P is initialized, the values of $p_{11}$ and $p_{44}$ can be selected as smaller values (corresponding respectively to x, y), whereas other values can be selected as bigger values.

$\alpha=(\alpha_1, \alpha_2, \ldots, \alpha_9)$ is a proportional coefficient of the multiple suboptimal fading factors, wherein $\alpha_i \geq 1$ and correspond respectively to the rate of change of the system state variables (x, vx, ax, y, vy, ay).

Figure 10:
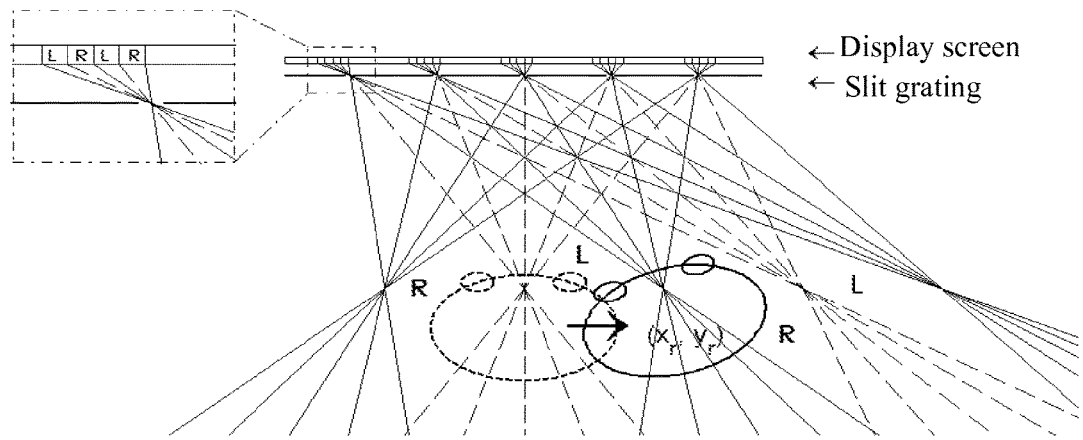
FIG. 10 illustrates a schematic diagram of an exemplary 3D display when a spatial delay is compensated consistent with the disclosed embodiments.

During object tracking described in various embodiments, the tracked object may be a head, a face or other parts of human body. FIG. 10 illustrates a schematic diagram of an exemplary 3D display when delay is compensated consistent with the disclosed embodiments.

As shown in FIG. 10, if the delay is compensated, a corresponding 3D image is displayed on a display apparatus after calculation (tracking, delay compensation and image arrangement) is completed at time $t0+\Delta t$, and left and right eye viewing areas of the 3D image point to the positions of the left eye and the right eye obtained by a compensation algorithm. Because the compensation algorithm compensates for the delay which is caused when a user moves during a time period $\Delta t$, the actual position of the user can be tracked and the image arrangement can be changed accordingly. Therefore, the 3D image can be displayed correctly.

The display apparatus may include a display module and a light-splitting device. The light-splitting device sends the image displayed by the display module to the left eye and the right eye of a user, such that the 3D image is displayed to the user.

On the basis of the tracking result obtained by using the current tracking method, the spatial delay during $\Delta t$ is compensated. Therefore, the data accuracy of the object tracking is improved, and the quality of glasses-free 3D display is ultimately improved.

Further, although the methods and apparatuses are disclosed for illustrative purposes, similar concept and approach can be applied to other display apparatus. Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In certain embodiments, current position coordinates of a moving object with a spatial delay are compensated through a filter acting on a time-varying system. The filter acting on the time-varying system may be used to filter noise for the current position coordinates, greatly reducing calculation error and system noise of the tracking algorithm, and removing data jilter in the current position coordinates of the tracked object. Therefore, the data accuracy of the object tracking is improved.

What is claimed is:

1. An object tracking method, comprising:
   obtaining current position coordinates of a tracked object for a first time using a tracking algorithm;
   based on the obtained current position coordinates, initializing a filter acting on a time-varying system;
   when the tracking algorithm outputs new current position coordinates of the tracked object with a spatial delay, updating a system state through the filter acting on the time-varying system;
   comparing a speed of the tracked object with a compensation determination threshold;
   when the speed of the tracked object is greater than the compensation determination threshold, providing delay compensation for the new current position coordinates of the tracked object with the spatial delay through the filter acting on the time-varying system; and
   outputting the compensated current position coordinates.

2. The method according to claim 1, wherein:
   the filter acting on the time-varying system is one of a Kalman filter, a smooth filter, a Butterworth filter, a binomial coefficient filter, and a Wiener filter.

3. The method according to claim 1, wherein:
   when the filter acting on the time-varying system is the Kalman filter, initialization of the Kalman filter includes initialization of a counter, a coefficient matrix of delay compensation, a sampling interval of a sensor, a posteriori estimation of the system state, a coefficient matrix of system state transition, a noise gain matrix of the system state, a noise covariance matrix of the system state, a measurement coefficient matrix, a measurement noise covariance matrix, and an error covariance matrix of the posteriori estimation of the system state.

4. The method according to claim 1, wherein:
   when the filter acting on the time-varying system is the Kalman filter, the Kalman filter, in combination with a strong tracking filter, updates the system state and compensates the current position coordinates of the tracked object.

5. The method according to claim 3, wherein:
   the strong tracking filter is a strong tracking filter with multiple suboptimal fading factors.

6. The method according to claim 3, further including:
   obtaining current position coordinates (x1, y1, z1) of the tracked object;
   based on the obtained current position coordinates, calculating a priori estimation $\hat{X}_-$ of the system state at a sampling time point by a state prediction equation;
   calculating a residual error $\gamma$ of a measurement equation using the priori estimation $\hat{X}_-$;
   calculating a first intermediate variable V of the strong tracking filter using the residual error $\gamma$;
   calculating a second intermediate variable N of the strong tracking filter using the first intermediate variable V;
   calculating a third intermediate variable M of the strong tracking filter using the second intermediate variable N;
   calculating a coefficient c of the multiple suboptimal fading factors using the third intermediate variable M;
   calculating the multiple suboptimal fading factors $\lambda_i$ of the strong tracking filter using coefficient c of the multiple suboptimal fading factors;
   calculating an error covariance matrix $P_-$ of a priori estimation of the system state of the Kalman filter using the multiple suboptimal fading factors $\lambda_i$;
   calculating a Kalman gain Kg of the Kalman filter using the error covariance matrix $P_-$ of a priori estimation of the system state;
   calculating a posteriori estimation $\hat{X}$ of the system state at a sampling time point by a measurement updating equation using the Kalman gain Kg; and calculating an error covariance matrix P of the posteriori estimation of the system state of the Kalman filter using the posteriori estimation $\hat{X}$.

7. The method according to claim 6, wherein:
the compensated current position coordinates of the tracked object are calculated by:

$$\begin{pmatrix} x_{real} \\ y_{real} \\ z_{real} \end{pmatrix} = \begin{cases} S * \hat{X}, \|vx, vy, vz\| \geq \tau \\ (x, y, z)^T, \|vx, vy, vz\| < \tau \end{cases}$$

wherein ($x_{real}$, $y_{real}$, $z_{real}$) are the compensated current position coordinates of the tracked object; (x, y, z) are the position coordinates in the posteriori estimation $\hat{X}$ of the Kalman filter; $\|(vx, vy, vz)\|$ is 2-norm of a speed value (vx, vy, vz); S is a coefficient matrix of the delay compensation; and $\tau$ is a compensation determination threshold, and $\tau > 0$.

8. The method according to claim 7, wherein:
the current position coordinates of the tracked object are one of three-dimensional (3D) coordinates and two-dimensional (2D) coordinates.

9. The method according to claim 1, further including:
controlling an image arrangement based on the current position coordinates;
displaying an image corresponding to the image arrangement on a display apparatus; and
sending the image displayed by the display apparatus to the left eye and right eye of a user, such that a 3D image is displayed.

10. An object tracking apparatus, comprising:
an object tracking unit configured to track a position of an object to obtain current position coordinates of the tracked object; and
an updating and compensation unit, including a filter acting on a time-varying system, configured to:
when the object tracking unit outputs the position coordinates of the tracked object for a first time, initialize the filter acting on the time-varying system;
when the object tracking unit outputs new current position coordinates with a spatial delay of the tracked object, update a system state through the filter acting on the time-varying system; and
when speed of the tracked object is greater than a compensation determination threshold, provide delay compensation for the current position coordinates of the tracked object through the filter acting on the time-varying system and output the compensated current position coordinates of the tracked object.

11. The apparatus according to claim 10, wherein:
the filter acting on the time-varying system is one of a Kalman filter, a smooth filter, a Butterworth filter, a binomial coefficient filter, and a Wiener filter.

12. The apparatus according to claim 10, wherein:
when the filter acting on the time-varying system is the Kalman filter, initialization of the Kalman filter includes initialization of a counter, a coefficient matrix of delay compensation, a sampling interval of a sensor, a posteriori estimation of the system state, a coefficient matrix of system state transition, a noise gain matrix of the system state, a noise covariance matrix of the system state, a measurement coefficient matrix, a measurement noise covariance matrix, and an error covariance matrix of the posteriori estimation of the system state.

13. The apparatus according to claim 12, wherein the updating and compensation unit further includes:
a strong tracking filter, in combination with the Kalman filter, configured to update the system state and provide delay compensation for the current position coordinates of the tracked object.

14. The apparatus according to claim 13, wherein:
the strong tracking filter is a strong tracking filter with multiple suboptimal fading factors.

15. The apparatus according to claim 14, wherein the updating and compensation unit is further configured to:
obtain current position coordinates (x1, y1, z1) of the tracked object;
based on the obtained current position coordinates, calculate a priori estimation $\hat{X}_-$ of the system state at a sampling time point by a state prediction equation;
calculate a residual error $\gamma$ of a measurement equation using the priori estimation $\hat{X}_-$;
calculate a first intermediate variable V of the strong tracking filter using the residual error $\gamma$;
calculate a second intermediate variable N of the strong tracking filter using the first intermediate variable V;
calculate a third intermediate variable M of the strong tracking filter using the second intermediate variable N;
calculate a coefficient c of the multiple suboptimal fading factors using the third intermediate variable M;
calculate the multiple suboptimal fading factors $\lambda_i$ of the strong tracking filter using coefficient c of the multiple suboptimal fading factors;
calculate an error covariance matrix $P_-$ of a priori estimation of the system state of the Kalman filter using the multiple suboptimal fading factors $\lambda_i$;
calculate a Kalman gain Kg of the Kalman filter using the error covariance matrix $P_-$ of a priori estimation of the system state;
calculate a posteriori estimation $\hat{X}$ of the system state at a sampling time point by a measurement updating equation using the Kalman gain Kg; and
calculate an error covariance matrix P of the posteriori estimation of the system state of the Kalman filter using the posteriori estimation $\hat{X}$.

16. The apparatus according to claim 10, wherein:
the compensated current position coordinates of the tracked object are calculated by:

$$\begin{pmatrix} x_{real} \\ y_{real} \\ z_{real} \end{pmatrix} = \begin{cases} S * \hat{X}, \|vx, vy, vz\| \geq \tau \\ (x, y, z)^T, \|vx, vy, vz\| < \tau \end{cases}$$

wherein ($x_{real}$, $y_{real}$, $z_{real}$) are the compensated current position coordinates of the tracked object; (x, y, z) are the position coordinates in the posteriori estimation $\hat{X}$ of the Kalman filter; $\|(vx, vy, vz)\|$ is 2-norm of a speed value (vx, vy, vz); S is a coefficient matrix of the delay compensation; and $\tau$ is a compensation determination threshold, and $\tau > 0$.

17. The apparatus according to claim 12, wherein:
the current position coordinates of the tracked object are one of 3D coordinates and 2D coordinates.

18. A 3D display apparatus, comprising:
an object tracking apparatus, including an object tracking unit and an updating and compensation unit, configured to obtain current position coordinates of a tracked object, wherein:

the object tracking unit is configured to track a position of the tracked object to obtain current position coordinates of the tracked object; and the updating and compensation unit, including a filter acting on a time-varying system, is configured to:

when the object tracking unit outputs the position coordinates of the tracked object for a first time, initialize the filter acting on the time-varying system;

when the object tracking unit outputs new current position coordinates with a spatial delay of the tracked object, update a system state through the filter acting on the time-varying system; and when speed of the tracked object is greater than a compensation determination threshold, provide delay compensation for the current position coordinates of the tracked object through the filter acting on the time-varying system and output the compensated current position coordinates of the tracked object;

a control module configured to control an image arrangement based on the current position coordinates;

a display module configured to display an image corresponding to the image arrangement; and a light-splitting device configured to send the image displayed by the display module to the left eye and right eye of a user, such that a 3D image is displayed.

19. The system according to claim 18, wherein:
the light-splitting device is one of a liquid crystal lens, a liquid crystal microlens, a microlens array, and a slit grating.

20. The system according to claim 18, wherein:
the filter acting on the time-varying system is one of a Kalman filter, a smooth filter, a Butterworth filter, a binomial coefficient filter, and a Wiener filter.

* * * * *